(Specimens.) 2 Sheets—Sheet 2.

W. MILLS.
TREATMENT OF FERRIC RESIDUE AND APPARATUS THEREFOR.

No. 585,044. Patented June 22, 1897.

Witnesses. Inventor.

UNITED STATES PATENT OFFICE.

WALTER MILLS, OF LONDON, ENGLAND.

TREATMENT OF FERRIC RESIDUE AND APPARATUS THEREFOR.

SPECIFICATION forming part of Letters Patent No. 585,044, dated June 22, 1897.

Application filed April 10, 1895. Serial No. 545,223. (Specimens.)

*To all whom it may concern:*

Be it known that I, WALTER MILLS, a subject of the Queen of Great Britain, residing at London, England, have invented new and useful Improvements in the Treatment of Ferric Residues and Apparatus Therefor; and I do hereby declare that the following is a full, clear, and exact description of the invention, which will enable others skilled in the art to which it appertains to make and use the same.

My invention relates to the treatment of ferric residues, such as the large quantities of comparatively worthless refuse produced— *e. g.*, when iron pyrites are burned in order to prepare sulfuric acid. These consist, chiefly, of ferric oxid, but also contain ferrosoferric oxid, ferrous sulfid, silica, and sometimes salts of other metals.

According to my invention the greater part of the substance is converted into ferrous oxid, which may be reduced to metallic iron or used as a pigment or in pharmacy.

In carrying out my invention I first pass the refuse over a screen or by any other suitable mechanical contrivance remove the stones which it contains. The remainder of the substance is ground up or crushed to a fine powder and passed through a magnetic separator which removes the ferrosoferric oxid and the greater part of and in some cases all the ferrous sulfid. The substance after this treatment is mixed with amorphous metallic iron in about the proportion of thirty-five pounds of iron to every one hundred pounds of ferric oxid which the substance contains, and this mixture is rammed into a crucible, heated to redness out of contact with air, and then cooled under the like conditions to the ordinary temperature, whereby I convert the ferric oxid into ferrous oxid in accordance with the formula $$Fe_2O_3 + Fe = 3FeO.$$

In working on a commercial scale I substitute for the crucible an iron tube, having a closely-fitting cover at each end, one of these covers having inserted into it an iron tap, so as to allow any air that may be present in the mixture to escape while it is being heated, the said tap, however, being closed before removing the tube from the furnace in which it is heated, so as to prevent access of air to the contents of the tube as it cools. The ferrous oxid thus obtained may be treated with a reducing-gas, such as hydrogen, coal-gas, water-gas, or carbonic-oxid gas, in the apparatus shown in the accompanying drawings, in which—

Figure 1:
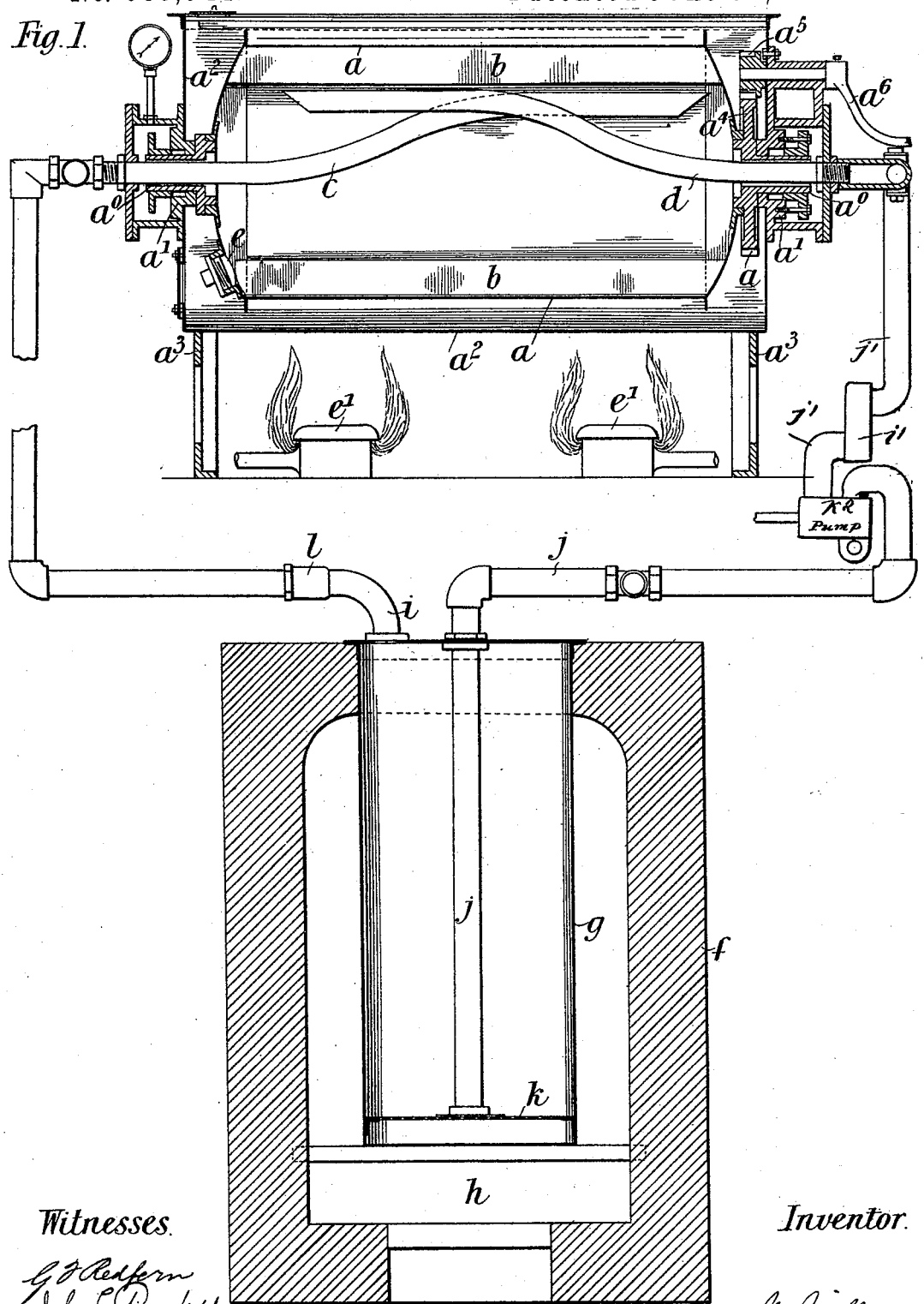
Figure 2:
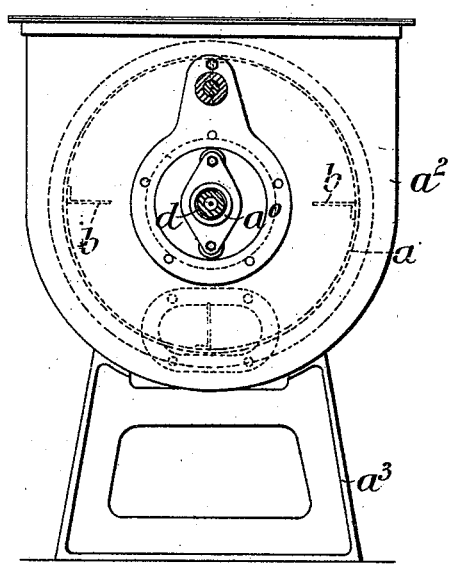
Figure 3:
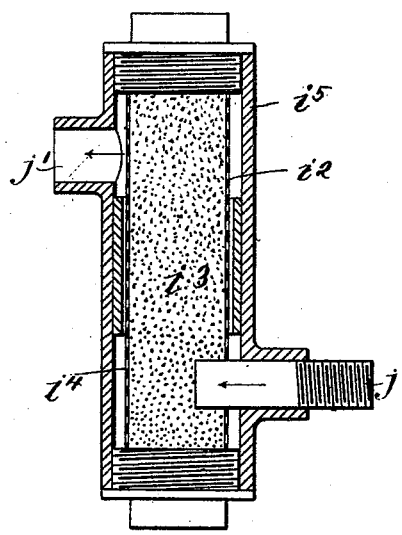

Figure 1 is a sectional elevation of the apparatus; Fig. 2, an end view of part of the same, and Fig. 3 a sectional view of a detail.

$a$ is a cylinder having journals $a^0$ $a^0$, mounted in bearings $a'$ $a'$ in the ends of a casing $a^2$, carried upon legs or standards $a^3$. $a^4$ is a gear-wheel upon one of the journals $a^0$, and $a^5$ is a pinion engaging therewith, adapted to be operated by a handle $a^6$. The said cylinder, which is made of iron or copper and so arranged that it can be heated to any required temperature, while supporting a pressure of about thirty pounds to the square inch, has baffle-plates $b$ $b$ fixed to its interior in order to agitate its contents as it revolves.

$c$ and $d$ are pipes or tubes which pass through the journals $a^0$ $a^0$, the pipe $c$ admitting the reducing-gas, while the pipe $d$ carries off the oxidized gas, the said pipes extending toward the walls of the cylinder.

$e$ is an opening closed by a plug, through which the cylinder $a$ is charged.

The casing $a^2$, inclosing the cylinder, is open at the bottom, so that the cylinder may be heated, for instance, by gas-burners $e'$ $e'$.

$f$ is the reducing-gas-producing apparatus, which comprises a chamber $g$, fixed in a furnace $h$, the upper part of the said chamber being connected by a pipe $i$ with the gas-inlet pipe $c$ of the revolving cylinder $a$, while the gas-discharge pipe $d$ of the said revolving cylinder is connected to a pipe $j$, which extends down into the chamber $g$ as far as a perforated plate $k$, near the bottom thereof. A pump $k^2$ (shown conventionally in Fig. 1) is placed in connection with the pipe $j$ to cause the circulation of the gas, a filter—such, for instance, as that shown in Fig. 3—being arranged between the suction-valve of the pump and the pipe $d$ for preventing dust from entering the pump.

The filter consists of an outer casing $i'$ of any suitable material and having any preferred form. Within is a casing $i^2$, containing any material $i^3$ that will permit the passage of the reducing-gas and arrest dust or any other foreign matter that may be carried by the gas-current. A wide range of choice will be suggested to any person familiar with the art among those substances capable of enduring the heat of the reducing-gas, which is not very great. The casing $i^2$ is provided with small openings $i^4$, or it may be formed of finely-reticulated material. The inlet-pipe $j$ enters the lower part of the casing $i^2$ and the outlet-pipe $j'$ enters the upper portion of the outer casing only, so that the air after filtering through the material $i^3$ must pass through the inner casing $i^2$ before entering the exit-pipe.

In working the apparatus the substance to be reduced is introduced into the cylinder $a$, which is hermetically closed and the air exhausted therefrom. It is then heated and the chamber $g$ is filled with coke and rendered incandescent by the heat of the furnace $h$. Carbonic-oxid gas generated in the chamber $g$ is then admitted through the pipe $i$ from the chamber $g$. As the carbonic-oxid gas enters the cylinder $a$ it comes in contact with the hot ferrous oxid contained therein, whereby the ferrous and also the copper oxids, if any, are reduced to metallic iron and copper, respectively, while the carbonic-oxid gas is oxidized to carbonic acid. The temperature at which this reaction takes place is comparatively low. I estimate that ferrous oxid is so reduced at about 400° centigrade, while it is well known that the oxids of copper are so reduced below that temperature.

The carbonic-acid gas extracted from the revolving cylinder $a$ by the pump is forced by the said pump into the chamber $g$ and through the red-hot coke or charcoal therein, whereby it is converted into carbonic oxid, its volume being at the same time doubled or considerably augmented. This increase in volume enables me to conduct the reducing operation within the cylinder $a$ under a slight pressure, which I find very beneficial in producing uniformly satisfactory products. I therefore attach at $l$ or some other convenient part of the apparatus a safety-valve weighted to about fifteen pounds to the square inch. This valve is connected with a pipe through which the superfluous carbonic-oxid gas is conducted to a gas-holder. The carbonic-acid gas produced within the cylinder $a$ having thus been reduced to carbonic oxid again enters the said cylinder by the pipe $i$. This operation is continued until all the reducible metallic oxids within the cylinder $a$ are converted into metal. I find it advantageous to make the pipe $i$ as short as is conveniently practicable, so as to utilize as much as possible all the heat contained in the carbonic-oxid gas as it issues from the chamber $g$, whereby the heat that is applied to the cylinder $a$ may be greatly economized.

When carbonic-acid gas ceases to be produced inside the cylinder $a$, the operation is stopped, the cylinder is allowed to cool somewhat, and then its contents are withdrawn. These consist of amorphous metallic iron, ferrous sulfid, silica, and sometimes other metals, such as copper. From this mixture the iron, which forms the great bulk of the substance, is removed by a magnetic separator.

In carrying out the operation of converting ferrous oxid into metallic iron the use of a reducing-gas is not essential. Finely-ground charcoal or coke will readily reduce ferrous oxid at a red heat; but I prefer to use carbonic-oxid gas, because it reduces ferrous oxid at a much lower temperature than is required when charcoal or coke is employed as the reducing agent. The iron produced by the action of carbonic oxid remains in an amorphous condition, whereby its separation from ferrous sulfid or other foreign substances is greatly facilitated.

In some cases the spent pyrites contain such a small quantity of silica and ferrous sulfid that they become available for conversion into a black pigment in the following manner: After being screened and ground up in the manner already described the spent pyrites are straightway mixed with amorphous metallic iron and heated to redness out of contact with air. The quantity of iron that has to be used depends upon the amount of ferric and ferrosoferric oxids present in the substance. Both these oxids are reduced to ferrous oxid by iron, but the latter requires a much higher temperature than the former. Ferric oxid takes about thirty-five per cent. of metallic iron for its reduction to ferrous oxid. Ferrosoferric oxid requires about twenty-five per cent.; but the reaction

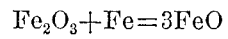

$$Fe_2O_3 + Fe = 3FeO$$

develops a great deal of heat, which assists in reducing any ferrosoferric oxid with which it may be in contact; so that I find that practically the same external heat is required for reducing to ferrous oxid the mixture of ferric and ferrosoferric oxids which occurs in spent iron pyrites as is necessary to be employed in reducing ferric oxid *per se*.

When ferrous oxid is required in a practically pure state—for instance, when required for pharmaceutical purposes—the impure ferrous oxid, prepared as aforesaid, is dissolved in dilute sulfuric acid and filtered. The ferrous sulfid contained in the impure substance is thus decomposed and a weak aqueous solution of ferrous sulfate is produced. To this I add a weak aqueous solution of soda or potash until no further precipitate is produced. This precipitate is placed upon a filter paper and washed with water until the fluid that runs from it gives no precipitate with an aqueous solution of barium chlorid. The substance in the filter is then dried at 100° centigrade and afterward at 350° centigrade. Pure ferric oxid is thus produced. One hundred grams of it are mixed with thirty-five grams of levigated iron. The mixture is tightly compressed into a two-inch spun-iron crucible, which is then closed and heated to redness in one of the "plate-warmers" employed by dentists. Great contraction of bulk ensues, ferrous oxid being produced. It has a specific gravity of 5.566, does not oxidize at ordinary temperatures in the atmosphere, or, even if boiled in water, dissolves readily in muriatic or sulfuric acids with evolution of much heat, and on being heated to about 400° centigrade in the air it spontaneously ignites, passing into ferric oxid.

Having now particularly described and ascertained the nature of my said invention and in what manner the same is to be performed, I declare that what I claim is—

1. The herein-described process of treating iron ores which consists in converting their ferric oxids into ferrous oxids by mixing finely-divided metallic iron with the ores and heating the mixture out of contact with the air, substantially as described.

2. The improvement in the treatment of ferric or ferrosoferric residues or ores, which consists in mingling with such residues, or ores, finely-divided or amorphous, metallic iron, heating this mixture out of contact with air, and cooling the same out of contact with air, whereby magnetic ferric oxids are converted into non-magnetic ferrous oxid, substantially as described.

3. The herein-described process of treating iron ores which consists in mixing therewith metallic iron, heating the same out of contact with the air, then treating the resulting ferrous oxid with carbonic-oxid gas under pressure, substantially as described.

4. The herein-described process of treating iron ores which consists in mixing therewith metallic iron, heating the mixture out of contact with the air, then cooling the mixture out of contact with the air, then heating the resulting ferrous oxid and treating the heated oxid with highly-heated carbonic-oxid gas under pressure, substantially as described.

5. The combination with the revoluble casing and the heater therefor, of a carbonic-oxid-gas generator, a pipe extending from said generator into the said casing having a discharge-opening adjacent to the periphery of said casing, a return-pipe extending from said casing to the generator, an exhausting device located in said return-pipe to create a circulation of gases in said generator pipes and casing and a filter interposed between said casing and said exhausting device, substantially as described.

WALTER MILLS.

Witnesses:
G. F. REDFERN,
JOHN E. BOUSFIELD.